United States Patent [19]

Bakkerus

[11] 3,718,351
[45] Feb. 27, 1973

[54] PIPE FITTING

[75] Inventor: Hermanus Bakkerus, Voorburg, Netherlands

[73] Assignee: Nederlandse Organisatie voor Toegepast-Natuurweten-schappelijk Onderzoek ten behoeve van Nijverheid, Handel en Verkeer, The Hague, Netherlands

[22] Filed: Aug. 16, 1971

[21] Appl. No.: 171,845

[30] Foreign Application Priority Data

Aug. 20, 1970 Netherlands .......................7012379

[52] U.S. Cl. ...................................285/236, 285/373
[51] Int. Cl. ...............................................F16l 21/06
[58] Field of Search.......285/236, 373, 419, DIG. 22; 24/20, 257, 259 C, 381

[56] References Cited

UNITED STATES PATENTS

| 2,451,438 | 10/1948 | Hartman | 285/236 |
| 3,353,567 | 11/1967 | Isreeli | 24/257 R X |
| 3,439,945 | 4/1969 | Chambers et al. | 285/373 |
| 3,402,946 | 9/1968 | Dedian | 285/236 |
| 3,249,685 | 5/1966 | Heflin | 285/236 X |
| 3,334,928 | 8/1967 | Schmunk | 285/236 X |
| 3,464,721 | 9/1969 | Surko | 285/236 X |

FOREIGN PATENTS OR APPLICATIONS

| 1,142,077 | 3/1957 | France | 285/425 |
| 1,282,373 | 11/1968 | Germany | 285/373 |
| 497,239 | 11/1950 | Belgium | 285/236 |

Primary Examiner—Thomas F. Callaghan
Attorney—Hugh Adam Kirk

[57] ABSTRACT

A pipe joint for connecting abutting ends of cast iron pipes comprising in a flexible sleeve, such as of rubber which is surrounded by one split socket, under stress, in particular out of cast iron, or a material that corresponds with its elasticity and has a resistance against corrosion that is comparable with that of the pipes to be connected.

3 Claims, 1 Drawing Figure

PATENTED FEB 27 1973 3,718,351
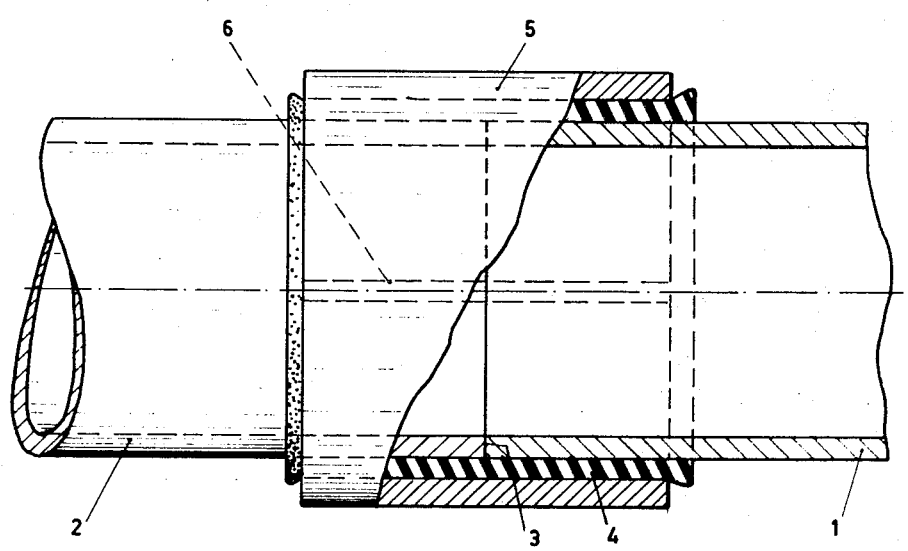
INVENTOR.
HERMANUS BAKKERUS
BY
Hugh A Kirk
ATTORNEY

PIPE FITTING

Background of the Invention

The invention relates to a pipe fitting, in particular for connecting cast iron pipes that, without being premachined are connected to each other coaxially, and in which a certain flexibility and an adaptation to the diameters of the various pipes is guaranteed automatically.

It is known in the art to connect a cast iron pipe with a normal end to a socket end of the following pipe, and filling the socket end with a seal, such as joint filler, that is held in place with a cast-in lead ring, which is then driven in with the aid of a handtool. This connection has been the customary one for years, especially when the pipe line is used for liquids or gases containing liquid. On transporting dry gases, however, the joint filler has the tendency to dry up, as a result of which there is a great chance of leakage especially when small saggings or deformations of the pipe line occur.

Consequently the modern trend is a pipe connection without a socket end and without the drawbacks involved, or the achievement of the connection involving expensive labor costs.

SUMMARY OF THE INVENTION

It is the object of the invention to improve this, maintain an absolutely closed fitting that is of simple manufacture and is able to compensate easily for the differences in diameter of the pipes within the tolerances, and moreover is insensitive to small deviations from the center lines of the pipes thereby being unaffected by differences in sagging of the various pipes.

Therefore, according to the invention, the fitting surrounds the abutting ends of the pipes and comprises one rubber sleeve surrounded by one split socket, under stress, and made out of cast iron or a material that corresponds with it or the pipe as regard to elasticity and resistance against corrosion. Preferably the split socket is made of the same cast iron as the pipes, but out of a pipe with a larger nominal diameter. These sockets may, for instance, then be made from the flawless parts of pipes that for one reason or other are condemned. Moreover, cast iron has the advantage, that within Hooke's Law, it permits a greater elastic deformation than steel.

BRIEF DESCRIPTION OF THE DRAWING

The invention is further elucidated below with reference to the accompanying drawing of a side view of an embodiment of a pipe fitting according to the invention on abutting sections of pipe, with part thereof being shown in cross-section.

DETAILED DESCRIPTION OF PREFERRED EMBODIMENT

According to the drawing, one end of a pipe 1 and one end of a pipe 2 are butted against each other. Around their abutting ends 3, a flexible rubber sleeve 4 is slid preferably somewhat snugly. Around the sleeve 4 is a clamping socket 5 which derives its elastic action from the facts that it is split at 6 and that the internal diameter of this socket 5 is smaller than the external diameter of the unclamped rubber sleeve 4. Owing to the presence of a gap 6 at the split in the socket 5, sleeve 4 effectively clamps around the pipe ends, and an elastic fitting between the two pipes 1 and 2 is obtained.

The fitting is brought about by placing sleeve 4 around one end of pipe 1 and placing over it socket 5 of which gap 6 is forced open with the aid of a spacer or an expanding tool, so that socket 5 is free from sleeve 4 and does not exert a compressive force on it. Then the end of pipe 2 is inserted in sleeve 4, which involves little effort because the sleeve is flexible and no compressive force is exerted on it by socket 5. As soon as the end of pipes 1 and 2 are butted against each other, the spacer or the expanding tool is removed from the split 6 of socket 5, as a result of which the split or gap 6 becomes much narrower. Owing to the stress that there is now applied by the resiliency of the socket 5, sleeve 4 compressed around the ends of the pipes 1 and 2, and a complete sealing of their abutting ends 3 is effected. Even when fairly high pressure prevails in the duct or pipes 1 and 2, no leakage will occur because the flexible sleeve 4 is substantially completely surrounded by elastically stretched socket 5, and bulging of the sleeve 4 could only be possible at the point of of intersection of the abutting end and the split or gap 6. Actually, gap 6 has such a slight breadth that a possibility of leakage on this point need not be feared.

With respect to the material or composition of the socket 5, it can be of cast iron which is known to have a good corrosion--resistance, or the socket 5 can be made of a similar resisilent material which is also corrosion-resistant. The socket 5 preferably made of the same material as the pipes 1 and 2, such as being cut off from pipe with a larger nominal diameter. Gap 6 therein can be milled or sawn or ground in the pipe of which socket 5 is made. Though in the embodiment shown, gap 6 is parallel to the pipes 1 and 2, it may be advantageous to make it run slantingly with respect to these pipes, to make it run sawtooth-wise, if desired. The breadth of gap 6, however, must in all cases be so sufficient to compress the flexible sleeve 4 and clamp it around the pipe ends 3.

The rubber sleeve 4 can be chosen to be resistant to many kinds of media. It can be either a natural rubber or a synthetic rubber or a plastic that meets the requirements for a long-term corrosion-resistance and also remains flexible and does not age into a non-flexible mass. Generally, the thickness of the sleeve 4 is chosen so that it easily takes up any differences in diameter of the two pipes 1 and 2 within the tolerances of these pipes. Although the drawing shows the sleeve 4 protruding beyond the ends of the socket 5, it is also possible that a shorter sleeve 4 can be used so that it lies entirely within the socket 5.

Because sleeve 4 forms a flexible intermediary between pipe ends 3 and socket 5, there is a certain degree of play present so that the center lines of the pipes 1 and 2 may make a small angle with each other. This means that a pipeline laid in the soil with the fittings of this invention will compensate easily for the differences in sagging between the various pipes of the line.

Although cast iron is described for the pipes 1 and 2 and socket 5, other materials can be used in a similar way, provided pipes of other material cannot be effected in a similar way provided the split socket 5 has sufficient elasticity to clamp the flexible sleeve 4 tight around the pipe ends 3. The most important requirement the material of socket 5 has to meet is that on forcing open and widening gap 6, socket 5 is not loaded beyond its elasticity limit, which would cause its plastic deformation, and then on removing the tool that keeps gap 6 open, the sleeve 4 would not be compressed sufficiently.

I claim:

1. A pipe fitting for connecting the abutting ends of pipes, consisting of an elastic circumferentially continuous sealing sleeve surrounding said ends, and an inherently resilient corrosion resistant split socket under stress comprising a cast-iron cylindrical tube having internal and external concentric surfaces throughout their entire lengths free of any internal and external projections, and the gap of said split extends the full length of said socket and is relatively narrow, the normal unstressed internal diameter of said socket being less than the normal uncompressed external diameter of said sleeve, and said socket being generally equal in length to said sleeve and surrounding and compressing, by its own resiliency only, said sleeve from both sides of and including said abutting ends of said pipes.

2. A pipe fitting according to claim 1 wherein the split in the socket is parallel to the axis of said socket.

3. A pipe fitting according to claim 1 wherein said sleeve is rubber.

* * * * *